(12) United States Patent
Ionel

(10) Patent No.: US 7,034,500 B2
(45) Date of Patent: Apr. 25, 2006

(54) ELECTRIC DRIVE ASSEMBLY

(75) Inventor: Dan M. Ionel, Fox Point, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

(21) Appl. No.: 11/008,491

(22) Filed: Dec. 9, 2004

(65) Prior Publication Data

US 2005/0163628 A1     Jul. 28, 2005

Related U.S. Application Data

(60) Provisional application No. 60/538,716, filed on Jan. 23, 2004.

(51) Int. Cl.
*H02K 17/36* (2006.01)

(52) U.S. Cl. .................. 318/772; 318/767; 318/781; 318/807; 318/821; 318/109; 310/112

(58) Field of Classification Search ............... 318/254, 318/727, 772, 109, 767, 781, 807, 821; 310/112
See application file for complete search history.

(56) References Cited

U.S. PATENT DOCUMENTS

| | | | |
|---|---|---|---|
| 2,763,823 A | 9/1956 | Symes | |
| 2,796,571 A * | 6/1957 | Dunn | 318/722 |
| 3,564,362 A | 2/1971 | Hill | |
| 3,600,655 A | 8/1971 | Karlin et al. | |
| 3,697,763 A | 10/1972 | Middlebrook | |
| 4,988,930 A | 1/1991 | Oberheide | |
| 5,134,351 A | 7/1992 | Msihid | |
| 5,165,249 A | 11/1992 | Thompson | |
| 5,357,180 A | 10/1994 | Speicher | |
| 5,371,445 A | 12/1994 | Couetoux | |
| 5,420,485 A | 5/1995 | Campbell, Jr. | |
| 5,426,353 A | 6/1995 | Stuhr et al. | |
| 5,767,635 A | 6/1998 | Steffens et al. | |
| 5,838,085 A | 11/1998 | Roesel, Jr. et al. | |
| 5,838,135 A * | 11/1998 | Satake et al. | 318/771 |
| 5,844,342 A | 12/1998 | Miyatani et al. | |
| 5,886,445 A | 3/1999 | Hsu | |
| 5,932,981 A * | 8/1999 | Vrionis | 318/480 |
| 5,990,590 A | 11/1999 | Roesel, Jr. et al. | |
| 6,028,404 A | 2/2000 | Yang | |
| 6,034,456 A * | 3/2000 | Osama et al. | 310/90.5 |
| 6,201,929 B1 | 3/2001 | Yu | |
| 6,624,601 B1 | 9/2003 | Arimitsu et al. | |
| 6,788,022 B1 * | 9/2004 | Sopko et al. | 318/772 |

FOREIGN PATENT DOCUMENTS

EP      0 567 781 A2    11/1993

* cited by examiner

*Primary Examiner*—Rita Leykin
(74) *Attorney, Agent, or Firm*—Michael Best & Friedrich LLP

(57) ABSTRACT

An electric drive includes a rotatable shaft, a first drive member, and a second drive member, and is supplied with power from a controller. The controller is operable to supply a first power from a power electronics converter, and a second power that is line power. Supplying the first power individually to the first drive member results in a first shaft speed and first output torque, supplying the second power individually to the second drive member results in a second shaft speed and second output torque, and supplying the first and the second drive members with power at the same time results in a third shaft speed and a third output torque.

49 Claims, 2 Drawing Sheets

ELECTRIC DRIVE ASSEMBLY

CROSS REFERENCE TO OTHER APPLICATIONS

This application claims priority under 35 U.S.C. sec. 119 to provisional patent application No. 60/538,716, filed on Jan. 23, 2004, the entire contents of which is hereby incorporated by reference.

FIELD OF THE INVENTION

The invention relates to an electric drive assembly.

BACKGROUND

Modern heating and cooling (HAC) equipment achieves high efficiency operation through the delivery of a variable volume of air. Operation at different preset speeds is traditionally achieved using a tapped, single-phase induction motor. The tapped, single-phase induction motor, while having the advantage of a reduced cost, has reduced energy efficiency, especially at low speed operation. Another conventional motor assembly providing variable speed operation includes a brushless, permanent-magnet motor and a power electronics controller. This motor assembly provides full variable speed operation on a wide torque-speed range and improves system efficiency, but has the disadvantage of largely increasing the cost of the equipment. It would be beneficial to have another alternative for an electric drive.

SUMMARY OF THE INVENTION

In one construction of the electric drive assembly described herein, the electric drive includes a first drive member that performs like a brushless permanent magnet motor and a second drive member that performs like an induction motor. Other types of drive members, which would ensure operation within the scope of the invention, are also possible.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
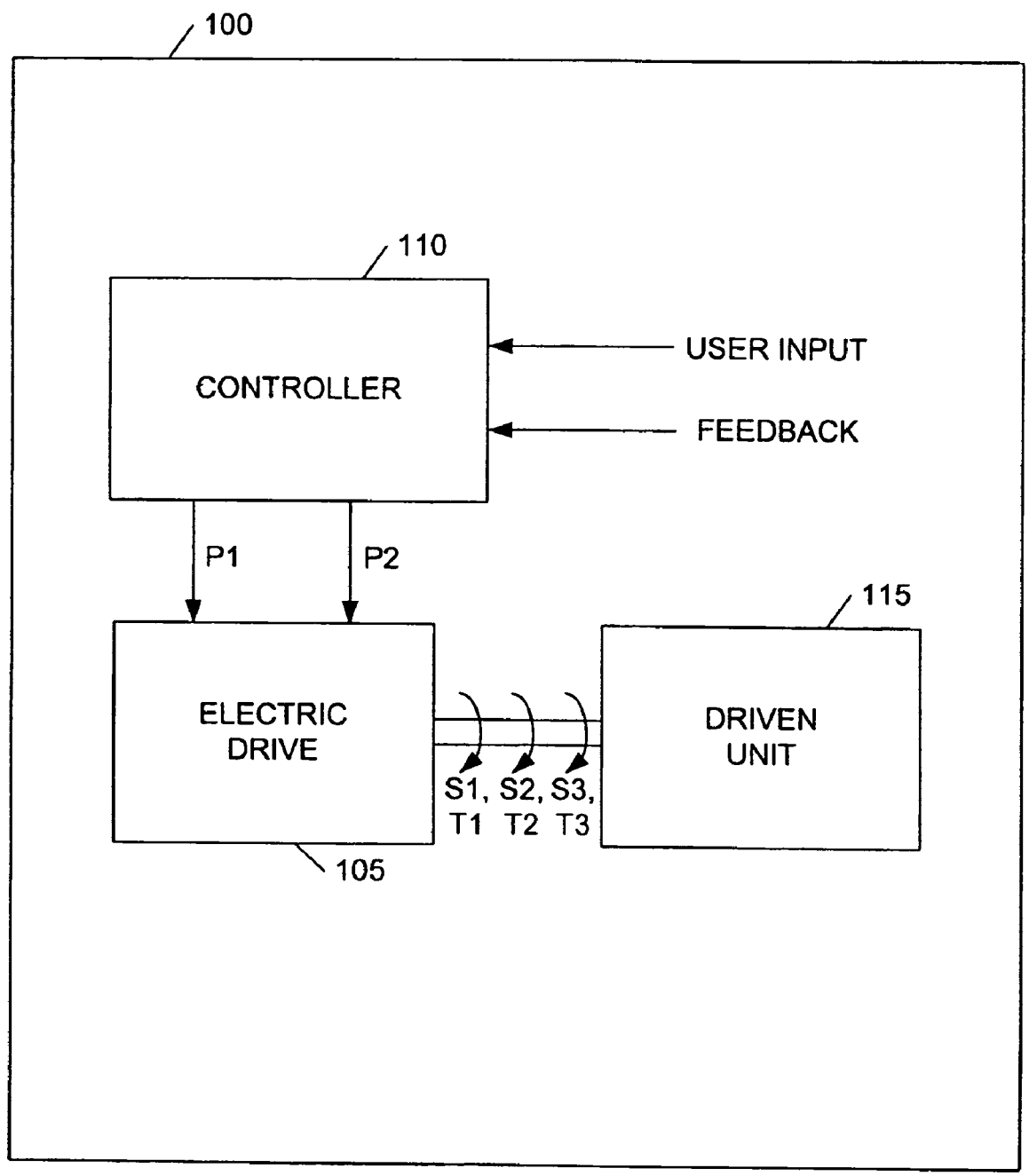
FIG. 1 is a schematic representation of an electric drive assembly incorporating the invention.

FIG. 1 schematically illustrates an electric drive assembly 100 incorporating the invention. The electric drive assembly 100 is capable of use in many applications such as a heating and cooling (HAC) system, which is used herein after as an example of one such application. The electric drive assembly 100 includes an electric drive 105 and a controller 110 electrically connected to the electric drive 105, and drives a driven unit 115. In one construction, the HAC system is a multiple-capacity heating and cooling system, the functionality of the controller 110 is incorporated in the controls of the HAC system, and the driven unit 115 is a blower assembly that delivers a variable volume of air to the environment conditioned by the HAC system.

The controller 110 provides a first power P1, a second power P2, or a combination thereof to the electric drive 105 based on a user input (e.g., an adjustment of a thermostat associated with the HAC system) and/or a feedback (e.g., a trigger resulting from a failure to reach a commanded temperature in the environment conditioned by the HAC system in a set amount of time). In one construction, at least one of the first and second powers P1 and/or P2 is selected from a range of powers, and in a second construction, at least one of the first and second powers P1 and/or P2 is fixed.

As described further below, supplying the first power P1 to the electric drive 105 results in a first drive speed S1 and first drive torque T1, supplying the second power P2 to the electric drive 105 results in a second drive speed S2 and second drive torque T2, and supplying the combination of the first and second powers P1 and P2 to the electric drive results in a third drive speed S3 (which will be substantially the same as S2) and a third drive torque T3. At least one of the drive speeds S1, S2, and/or S3 can include a range of speeds and at least one of the drive torques T1, T2, and T3 can include a range of torques.

Figure 2:
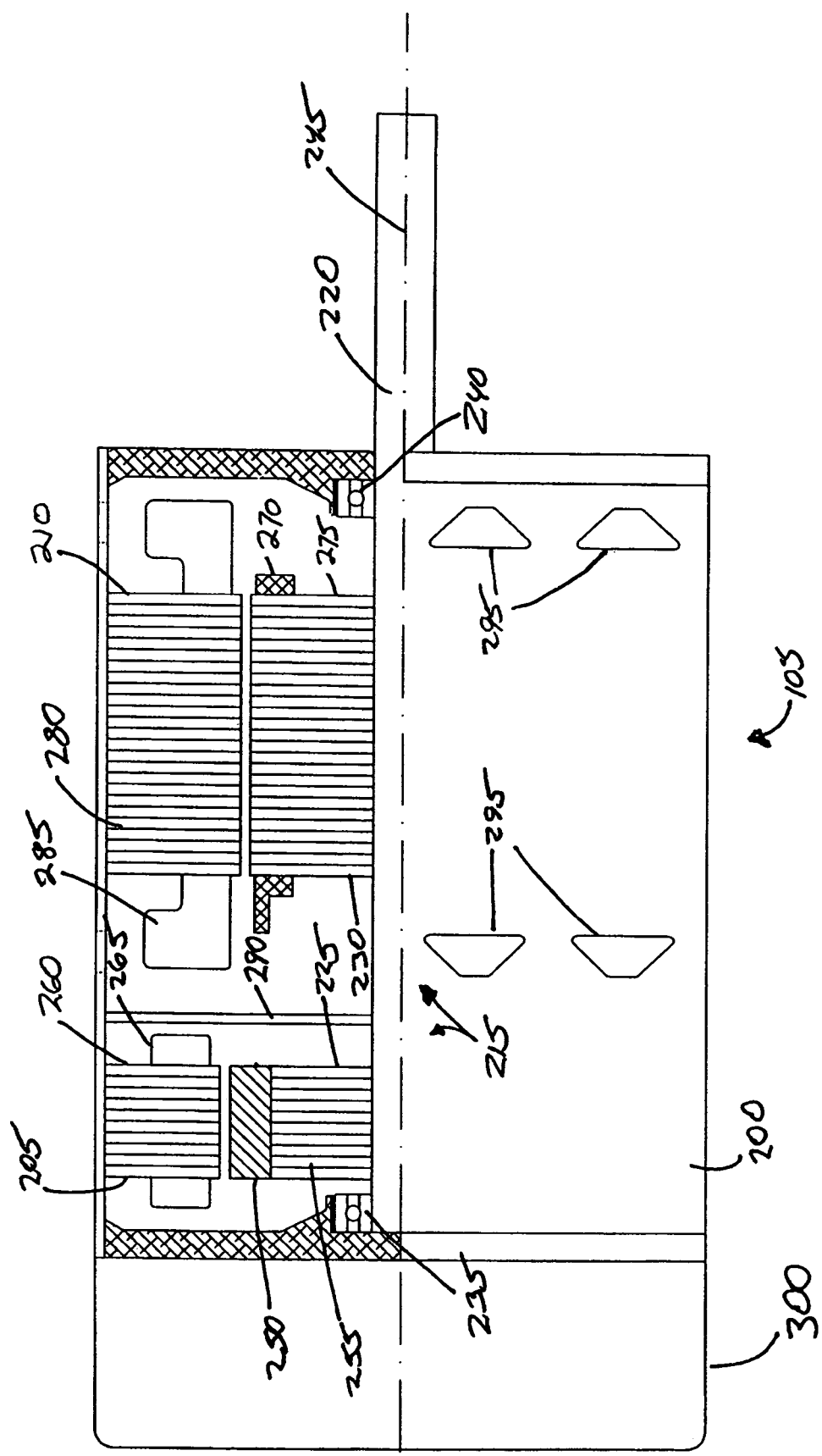
FIG. 2 is a partial side view and partial cross-sectional view of an electric drive capable of being used with the electric drive assembly of FIG. 1.

As shown in FIG. 2, one construction of the electric drive 105 includes a housing 200, a first stator 205 fixed relative to the housing 200, a second stator 210 fixed relative to the housing 200, and a rotor assembly 215. The rotor assembly 215 includes a shaft 220, a first rotor member 225, and a second rotor member 230. The shaft 220 is supported by at least one bearing (two bearings 235 and 240 are shown in FIG. 2) and is rotatable about an axis 245. The first and second rotor members 225 and 230 are connected to the shaft and rotate therewith relative to the first and second stators 205 and 210, respectively.

In the construction shown in FIG. 2, the first rotor member 225 includes a plurality of magnetic poles 250 of alternating polarity connected to the outer surface of a first core 255. The magnetic poles 250 can include a plurality of strips of permanent magnet material attached (e.g., with adhesive) around the first rotor core 255. The permanent magnet material can be magnetized by a magnetizer to provide a plurality of alternating magnetic poles. Additionally, the number of magnetic strips can be different than the number of magnetic poles. In other constructions, the rotating member 225 contains blocks of permanent magnet material placed inside the first rotor core 255. The first rotor core 255 is secured to or formed with the shaft 220, and comprises laminations (e.g., magnetic steel laminations), and/or solid material (e.g., a solid magnetic steel core), and/or compressed powdered material (e.g., compressed powder of magnetic steel).

In the construction shown in FIG. 2, the first stator 205 is designed to interact with the first rotating member 225. The first stator 205 includes a first stator core 260 having a first plurality of stator teeth and at least a first stator winding 265. The first stator core 260 comprises laminations (e.g., magnetic steel laminations) and/or compressed powdered material (e.g., compressed powder of magnetic steel). The stator winding(s) 265 includes a first plurality of electrical conductors placed in the slots and around the first plurality of stator teeth. The first plurality of electrical conductors electrically connect to the controller 110 and receive the first power P1 from the controller 110. Other constructions of the first stator known to those skilled in the art can be used to interact with the first rotor member 225.

The first stator 205 and the first rotor member 225 form a first drive member. The first drive member operates like a brushless permanent magnet (PM) motor. When the first power P1 is applied to the first plurality of electric conductors, the first stator 205 produces a first magnetic field in response thereto. The first magnetic field interacts with a second magnetic field, resulting from the magnetic poles 250 of the first rotor member 225, to produce a movement of the rotor assembly 215.

Referring again to FIG. 2, the second rotor member 230 includes a plurality of closed electric circuits 270 connected to a second rotor core 275. In one construction, the plurality of closed circuits includes a plurality of conducting bars running substantially parallel to the axis 245. The conducting bars are short-circuited at the ends by conducting rings located on the longitudinal ends of the rotor member 230. Both the conducting bars and conducting rings are connected to the second rotor core 275. Other constructions can be used to create the plurality of closed electric circuits, commonly referred to as an induction motor squirrel cage. The second rotor core 275 is secured to or formed with the shaft 240, and comprises laminations (e.g., magnetic steel laminations) and/or compressed powdered material (e.g., compressed powder of magnetic steel).

In the construction shown in FIG. 2, the second stator 210 is designed to interact with the second rotor member 230. The second stator 210 includes a second stator core 280 having a second plurality of stator teeth and at least a second stator winding 285. The second stator core 280 comprises laminations (e.g., magnetic steel laminations) and/or compressed powdered material (e.g., compressed powder of magnetic steel). The second stator winding(s) 285 includes a second plurality of electrical conductors placed in the slots and around the second plurality of teeth. The second plurality electrical conductor(s) electrically connects to the controller 110 and receives the second power P2 from the controller 110. Other constructions of the second stator 210 known to those skilled in the art can be used to interact with the second rotor member 230.

The second stator 210 and the second rotor member 230 form a second drive member. The second drive member operates like an induction motor. When the second power P2 is applied to the second plurality of electrical conductors, the second stator 210 produces a third magnetic field in response thereto. The third magnetic field interacts with the second rotor member 230 inducing current in the rotor conductor 270, resulting in a fourth magnetic field. Interaction between the third and fourth magnetic fields causes a movement of the rotor assembly 215.

Referring again to FIG. 2, the first rotor member 225 and the first stator 205 are isolated from the second rotating member 230 and the second stator 210 by a screen 290 or shield (e.g., a steel or plastic wall). This isolation may be beneficial, for example, to allow for cooling of the second drive member via one or more air vents 295, but preventing the cooling fluid from coming in direct contact with the first drive member.

The description of the invention is not limited to a particular mechanical construction, geometry, or position of the members within the electric drive 105. For example, FIG. 2 shows the electric drive 105 including the first and second rotor members 225 and 230 and the first and second stators 205 and 210 being housed by the housing 200. However, in another construction, the first rotor member 225 and the first stator 205 can be housed in a first housing or housing member, and the second rotor member 230 and the second stator 210 can be housed in a second housing or a second housing member. In yet another construction, the first and second stator cores 260 and 280 can be combined to form a single core. The single core can comprise a first stator member having a first plurality of conductors and a second stator member having a second plurality of conductors. It is even envisioned that the single core can use the same conductors for interacting with the first rotor member 225 and the second rotor member 230. Also shown in FIG. 2 is that the first and second rotor members 225 and 230 are positioned radially within the first and second stators 205 and 210, respectively. However, in another construction, the first and second rotor members can be positioned radially external to the first and second stators, respectively (i.e., the drive is an externalor outerrotor drive). It is also envisioned that combinations of the above constructions are possible.

The controller 110 energizes the first and/or second stators 205 and 210 by providing power to the first and/or second stator windings, respectively. In one construction, the controller 110 includes a first control circuit to control the first drive member and a second control circuit for controlling the second drive member. As discussed above, the first drive member operates like a brushless, PM motor, and consequently, the first control circuit is designed to operate a brushless, PM motor. In a more specific construction, the first control circuit includes a first device (e.g., a microcontroller, a processor and memory, a programmable logic controller, an application specific integrated circuit, etc.) and an inverter with one or more power electronic switches (e.g., MOSFET, IGBT) to vary the flow of power to the windings depending on various operating parameters (e.g., speed, load, rotor position, etc.). The first control circuit can include other components and circuitry (e.g., positioning circuitry) known to those skilled in the art. Further and as described above, the second drive member operates like an induction motor, and consequently, the second control circuit is designed to operate an induction motor. In one simple construction, the second control circuit includes a switch that controllably provides line power to the induction motor. Alternatively, the second control circuit can include a second control device (e.g., a microcontroller, a processor and memory, a programmable logic controller, an application specific integrated circuit, etc.) and an inverter with one or more power electronic switches (e.g., MOSFET, IGBT) to vary the flow of power to the second drive member depending on various operating parameters (e.g., speed, load, rotor position, etc.). It is also envisioned that components of the first and second control circuits can be combined (e.g., the first and second control circuits can use the same control device). Additionally and as shown in FIG. 2, some or all of the circuitry of the first and second control circuits can be housed in a compartment 300 coupled with the electric drive 105.

As discussed above, the invention can be used for, but not restricted to, HAC equipment. HAC equipment has a "cubed-law" power-speed characteristic. In one construction of the HAC, the equipment runs at approximately a first (or "low") speed and at approximately a second (or "high") speed, where the ratio between the second and first speeds typically is in the range 1.5 to 2. The first or "low" speed setting can be used to improve heating/cooling comfort and efficiency. In one construction of the electric drive, the first drive member (i.e., the brushless PM drive member) is supplied by the first control circuit such that the first drive member delivers variable speed operation in a first (or "low") speed range, and the second drive member (i.e., the induction drive member) is supplied by the second control circuit such that the second drive member delivers a rated power at a second (or "high") rated speed (e.g., the second drive member is line fed and operates at the second speed). By using the brushless PM drive member for driving the electric drive 105 at low-speed operation, the electric drive 105 can take advantage of the efficiency and high specific torque of the brushless PM drive, and also minimizes the cost of electronics for the first control circuit (due to the lower power, speed requirements). By using the induction drive member for driving the electric drive 105 at high-speed operation, the electric drive 105 can take advantage of the reduced costs associated with the induction drive at high-speed operation, especially if supplied directly from the mains. In another construction, the first and second drive members can drive the equipment concurrently in mechanical tandem, thereby providing even more benefit to the electric drive 105. One example of a method suitable for concurrent operation of the drive members, using control techniques known to those skilled in the art, consists of operating in "high" speed mode with power supplied to the second drive member only, detecting the direction of rotation and the shaft speed, connecting the first member to the power supply and increasing its torque command, resulting in a power loading of the first drive member and a power unloading of the second drive member, while maintaining the shaft synchronization of the two drive members. The concurrent control allows for additional torque at "high" speed operation.

As previously mentioned, other types of drive members, which would ensure operation within the scope of the invention are also possible. For example, in one construction the first drive member includes a stator and a rotor capable of operating as a brushed DC motor and the second drive member includes a stator and a rotor capable of operating as an induction motor. In another construction, the first drive member includes a stator and a rotor capable of operating as a brushless PM motor and the second drive member includes a stator and a rotor capable of operating as a self-starting synchronous reluctance motor. In yet another construction, the first drive member includes a stator and a rotor capable of operating as a brushless PM motor, and the second drive member includes a stator and a rotor capable of operating as a self-starting synchronous PM motor, having a polarity different than that of the first drive motor.

What is claimed is:

1. An electric drive assembly for driving a driven unit, comprising:
   a controller configured to supply a first power and a second power, wherein the first power is from a power electronics converter and the second power is line power;
   an electric drive electrically connected to the controller and including
   a housing,
   a shaft connected to the driven unit and rotatable with respect to the housing,
   a first drive member including a first stator fixed relative to the housing and a first rotor member that is connected to the shaft and rotatable therewith, wherein the first drive member receives the first power,
   a second drive member including a second stator fixed relative to the housing and a second rotor member that is connected to the shaft and rotatable therewith, wherein the second drive member receives the second power; and
   wherein when the controller supplies power to the first drive member but not to the second drive member, the electric drive produces a first shaft speed and a first output torque, when the controller supplies power to the second drive member but not to the first drive member, the electric drive produces a second shaft speed and a second output torque, and when the controller supplies power to the first drive member at the same time that it supplies power to the second drive member, the electric drive produces a third shaft speed and a third output torque.

2. The electric drive assembly of claim 1, wherein the controller includes a first control circuit and a second control circuit, the first control circuit including an inverter having at least one power switch to vary the flow of the first power, and the second control circuit including a switch to controllably provide line power to the second drive member.

3. The electric drive assembly of claim 1, wherein the third output torque is greater than the second output torque.

4. The electric drive assembly of claim 3, wherein the third shaft speed is substantially the same as the second shaft speed.

5. The electric drive assembly of claim 4, wherein the second shaft speed is greater than the first shaft speed.

6. The electric drive assembly of claim 1, wherein the first drive member operates like a permanent magnet motor when the first stator is supplied with the first power.

7. The electric drive assembly of claim 1, wherein the second drive member operates like an induction motor when the second stator is supplied with the second power.

8. The electric drive assembly of claim 7, wherein the second drive member is a permanent-split capacitor induction motor.

9. An electric drive assembly for driving a driven unit, comprising:
   a controller configured to supply a first power and a second power;
   an electric drive electrically connected to the controller and including
   a housing,
   a shaft connectable to the driven unit and rotatable with respect to the housing,
   a first drive member including a first stator fixed relative to the housing and a first rotor member that is connected to the shaft and rotatable therewith, the first rotor member including a plurality of permanent magnet poles, wherein the first drive member operates like a permanent magnet motor when the first stator is supplied with the first power,
   a second drive member including a second stator fixed relative to the housing and a second rotor member that is connected to the shaft and rotatable therewith, the second rotor member including a plurality of poles, wherein the second drive member operates like an induction motor when the second stator is supplied with the second power; and wherein when the controller supplies power to the first stator but not to the second stator, the electric drive produces a first shaft speed and a first output torque, when the controller supplies power to the second stator but not to the first stator, the electric drive produces a second shaft speed and a second output torque, and when the controller supplies power to the first stator at the same time that it supplies power to the second stator, the electric drive produces a third shaft speed and a third output torque.

10. The electric drive assembly of claim 9, wherein the first power is power from an inverter.

11. The electric drive assembly of claim 9, wherein the second power is AC line power.

12. The electric drive assembly of claim 9, wherein the controller includes a first control circuit and a second control circuit, the first control circuit including an inverter having at least one power switch to vary the flow of the first power, and the second control circuit including a switch to controllably provide AC line power to the second stator.

13. The electric drive assembly of claim 9, wherein the controller includes a control device and an inverter for supplying the first power and the second power.

14. The electric drive assembly of claim 13, wherein the controller is housed in a compartment of the housing.

15. The electric drive assembly of claim 9, wherein the first shaft speed is a range of speeds and the second shaft rated speed is substantially constant.

16. The electric drive assembly of claim 9, wherein a ratio of the second shaft speed to a first shaft speed is in the range of 1.5 to 2.0.

17. The electric drive assembly of claim 9, wherein the second shaft speed is greater than the first shaft speed.

18. The electric drive assembly of claim 9, wherein the first shaft speed includes a range of speeds and the first output torque includes a range of torques.

19. The electric drive assembly of claim 9, wherein the third torque is greater than the second torque.

20. The electric drive assembly of claim 12, wherein the first shaft speed is a range of speeds and the second shaft rated speed is substantially constant.

21. An electric drive controllable by a controller, the controller configured to provide to the electric drive a first power and a second power, the electric drive comprising:
a housing;
a shaft rotatable relative to the housing;
a first rotor member connected to the shaft and including a first rotor core and a plurality of alternating magnetic poles connected to the first rotor core;
a second rotor member connected to the shaft and including a second rotor core and a plurality of closed electric circuits connected to the second rotor core;
a first stator fixed relative to the housing, adapted to receive the first power and interact with the first rotor member, and including a plurality of stator teeth and a first stator winding;
a second stator fixed relative to the housing, adapted to receive the second power and interact with the second rotor member, and including a plurality of stator teeth and a second stator winding; and
wherein when the first power is applied to the first stator, a first magnetic field is produced that interacts with a second magnetic field resulting from the plurality of alternating magnetic poles of the first rotor member to produce movement of the shaft, and when the second power is applied to the second stator, a third magnetic field is produced that interacts with the second rotor member to create a fourth magnetic field such that interaction between the third and fourth magnetic fields operates to produce movement of the shaft.

22. The electric drive of claim 21, wherein when power is applied to the first stator but not to the second stator, a first shaft speed and first output torque are produced.

23. The electric drive of claim 22, wherein the first shaft speed includes a range of speeds and the first output torque includes a range of torques.

24. The electric drive of claim 22, wherein when power is applied to the second stator but not to the first stator, a second shaft speed and second output torque are produced.

25. The electric drive of claim 24, wherein the second shaft rated speed is substantially constant.

26. The electric drive of claim 24, wherein the second shaft speed includes a range of speeds and the second output torque includes a range of torques.

27. The electric drive of claim 24, wherein the second shaft speed is greater than the first shaft speed.

28. The electric drive of claim 24, wherein when the first power is applied to the first stator at the same time that the second power is applied to the second stator, a third shaft speed and third output torque are produced.

29. The electric drive of claim 28, wherein the third shaft speed is a substantially constant speed.

30. The electric drive of claim 28, wherein the third torque is greater than the second torque.

31. An electric drive controlled by a controller configured to supply a first power and a second power, the electric drive comprising:
a housing having at least a first portion and a second portion, wherein the first portion is separated from the second portion by a shield, and air vents are included in the second portion but not the first portion;
a shaft rotatable with respect to the housing;
a first drive member including a first stator fixed relative to the housing and a first rotor member connected to the shaft and rotatable therewith, the first rotor member including a plurality of alternating magnetic poles, wherein the first drive member operates like a permanent magnet motor when the first stator is supplied with the first power;
a second drive member including a second stator fixed relative to the housing and a second rotor member connected to the shaft and rotatable therewith, the second rotor member including a plurality of poles, wherein the second drive member operates like an induction motor when the second stator is supplied with the second power; and
wherein when power is supplied to the first stator but not to the second stator, a first shaft speed and a first output torque are produced, and when power is supplied to the second stator but not the first stator, a second shaft speed and second output torque are produced.

32. The electric drive of claim 31, further wherein when power is supplied to the first stator and the second stator at the same time, a third shaft speed and a third output torque are produced.

33. The electric drive of claim 31, wherein the first power is power from an inverter.

34. The electric drive of claim 33, wherein the second power is power from an inverter.

35. The electric drive of claim 33, wherein the second power is AC line power.

36. The electric drive of claim 31, wherein the first shaft speed is a range of speeds and the second shaft rated speed is substantially constant.

37. An electric drive controllable by a controller for driving a driven unit, the controller configured to supply a first power and a second power, the electric drive comprising:
   a housing;
   a shaft connectable to the driven unit and rotatable with respect to the housing;
   a first drive member including a first stator fixed relative to the housing and a first rotor member that is connected to the shaft and rotatable therewith, the first rotor member including a plurality of permanent magnet poles, wherein the first drive member operates like a permanent magnet motor when the first stator is supplied with the first power;
   a second drive member including a second stator fixed relative to the housing and a second rotor member that is connected to the shaft and rotatable therewith, the second rotor member including a plurality of poles, wherein the second drive member operates like an induction motor when the second stator is supplied with the second power; and
   wherein when the controller supplies power to the first stator but not to the second stator, the electric drive produces a first shaft speed and a first output torque, when the controller supplies power to the second stator but not to the first stator, the electric drive produces a second shaft speed and a second output torque, and when the controller supplies power to the first stator at the same time that it supplies power to the second stator, the electric drive produces a third shaft speed and a third output torque.

38. The electric drive of claim 37, wherein the first shaft speed is a range of speeds.

39. The electric drive of claim 38, wherein the second shaft rated speed is substantially constant.

40. The electric drive of claim 39, wherein the ratio of the second shaft speed to the first shaft speed is in the range of 1.5 to 2.0.

41. The electric drive of claim 37, wherein the second shaft speed is greater than the first shaft speed.

42. The electric drive of claim 41, wherein the third shaft speed is substantially the same as the second shaft speed and the third torque is greater than the second torque.

43. The electric drive of claim 37, wherein the third shaft speed is substantially the same as the second shaft speed and the third torque is greater than the second torque.

44. The electric drive assembly of claim 1, wherein at least one of the first drive member and the second drive member is a radial gap type drive member.

45. The electric drive assembly of claim 1, wherein the first drive member operates as a brushless PM motor and the second drive member operates as a self-starting synchronous reluctance motor.

46. The electric drive assembly of claim 9, wherein at least one of the first drive member and the second drive member is a radial gap type drive member.

47. The electric drive of claim 21, wherein a radial gap exists between the first stator and the first rotor member and between the second stator and the second rotor member.

48. The electric drive of claim 31, wherein at least one of the first drive member and the second drive member is a radial gap type drive member.

49. The electric drive of claim 37, wherein at least one of the first drive member and the second drive member is a radial gap type drive member.

* * * * *